United States Patent
Söderlund et al.

(10) Patent No.: US 7,149,272 B2
(45) Date of Patent: Dec. 12, 2006

(54) FILTER FOR COOLING WATER IN A LIGHT WATER COOLED NUCLEAR REACTOR

(75) Inventors: Anders Söderlund, Surahammar (SE); Håkan Söderberg, Västeås (SE)

(73) Assignee: Westinghouse Electric AB Sweden (SE)

( * ) Notice: Subject to any disclaimer, the term of this patent is extended or adjusted under 35 U.S.C. 154(b) by 255 days.

(21) Appl. No.: 10/466,832

(22) PCT Filed: Jan. 21, 2002

(86) PCT No.: PCT/SE02/00095

§ 371 (c)(1),
(2), (4) Date: Nov. 19, 2003

(87) PCT Pub. No.: WO02/058075

PCT Pub. Date: Jul. 25, 2002

(65) Prior Publication Data

US 2004/0076253 A1 Apr. 22, 2004

(30) Foreign Application Priority Data

Jan. 22, 2001 (SE) .................................. 0100169

(51) Int. Cl.
*G21C 19/42* (2006.01)
(52) U.S. Cl. ........................ 376/310; 376/308; 376/313
(58) Field of Classification Search ................ 376/310, 376/308, 313, 439, 352, 409
See application file for complete search history.

(56) References Cited

U.S. PATENT DOCUMENTS

| | | | |
|---|---|---|---|
| 5,030,412 A | 7/1991 | Yates et al. | |
| 5,100,611 A | 3/1992 | Nylund | |
| 5,225,152 A | 7/1993 | Verdier | |
| 5,361,287 A | 11/1994 | Williamson | |
| 5,390,220 A * | 2/1995 | Zuloaga et al. | 376/313 |
| 5,481,577 A | 1/1996 | Yates et al. | |
| 5,483,564 A | 1/1996 | Matzner et al. | |
| 5,524,031 A * | 6/1996 | Kilian | 376/261 |

FOREIGN PATENT DOCUMENTS

| | | |
|---|---|---|
| DE | 465 644 | 10/1991 |
| DE | 296 15 575 | 2/1997 |
| SE | 465 192 | 8/1991 |

OTHER PUBLICATIONS

Merriam-Webster's Collegiate Dictionary, 10th edition, p. 411.*

* cited by examiner

Primary Examiner—Ricardo J. Palabrica
(74) Attorney, Agent, or Firm—Bingham McCutchen LLP (57) ABSTRACT

The invention refers to a filter (1) for separating particle from cooling water in a nuclear plant, and a fuel assembly with such a filter. The filter has an inlet end (2) and an outlet end (3) and permits through-flow of the cooling water in a main flow direction (x). The filter includes a number of sheets (4) extending in the flow direction from the inlet end to the outlet end. The sheets are arranged beside each other and form passages for the cooling water. The sheets include a first portion (4') extending from the inlet end (2), a second portion (4") extending from the outlet end (3), and a third portion (4''') extending between the first portion (4') and the second portion (4"). The sheets (4) have along the first portion continuous wave-shape extending in a direction (y) transversally to the flow direction (x) and along the third portion a continuous wave-shape extending in the flow direction (x).

16 Claims, 6 Drawing Sheets

FILTER FOR COOLING WATER IN A LIGHT WATER COOLED NUCLEAR REACTOR

THE BACKGROUND OF THE INVENTION AND PRIOR ART

The present invention refers to a filter according to the preamble of claim 1. The invention also refers to a fuel assembly.

The invention will be described in an application for nuclear plants for cleaning the cooling water, which flows through a nuclear reactor of a light water type, from debris and other particles. However, the invention is not limited to any particular positioning of the filter in the nuclear plant.

It is important to clean the cooling water in a nuclear plant. The purpose of the cooling water is to function as a cooling fluid and a moderator in the nuclear reactor of the nuclear plant. If debris or other particles are permitted to follow the cooling water in the core of the reactor, these may cause defects to the cladding of the fuel rods, which may result in such defects that nuclear fuel, i.e. uranium leaks out into the cooling water. At larger defect, the operation of the reactor has then to be interrupted and the failed fuel be replaced. Such a replacement is time-consuming and expensive. Debris and other particles may of course also cause defects to other components in a nuclear plant, for instance pumps.

Such debris may consist of metal chips, which are formed in connection with different repairs of components of the plant, metal wires or other foreign particles which have reached the plant from outside. Particularly difficult particles are such with an elongated shape, i.e. thin wires or chips which may have a length of down to 10 mm. Such particles tend to get attached to the fuel assembly at a higher level, for instance to spacers. The particles are vibrating in the cooling water stream and may wear the cladding of the fuel rods so that a hole arises. At the same time it is important not to filter away particles which are not considered to be dangerous since all matters which are caught by the filter increase the pressure drop across the filter. Such particles may for instance be blasting sand with the size of 1–2 mm and mineral particles, which may reach the cooling water in case of defects.

In order to solve this problem, it is known to provide some form of a filter in the lower part of the fuel assemblies, which include a number of fuel rods and which form the core of the reactor. The cooling water, which circulates through the reactor, passes through this lower part of the fuel assemblies. For instance, the bottom plate of the fuel assembly may be provided with a plurality of small holes through which the cooling water passes. Possible debris or other particles may thus be caught by such a filter. There are two important requirements on such a filter, on one hand it is to catch all particles which may cause defects in the reactor in an efficient manner and on the other hand it is to have a low flow resistance and pressure drop.

SE-B-465 192, U.S. Pat. No. 5,481,577 and U.S. Pat. No. 5,030,412 disclose different such filters for catching debris in the cooling water flowing through a nuclear reactor. SE-B-465 192 suggests holes in the bottom plate, which have different portions with centre lines that are displaced in relation to each other. U.S. Pat. No. 5,481,577 suggests a filter which consists of a number of sheets arranged beside each other and forming passages for the cooling water. The passages are relatively thin but have a large width, which makes it possible for elongated debris particles to pass. U.S. Pat. No. 5,030,412 discloses a filter, which includes a plane metal sheet, which has relatively elongated passages that let the cooling water through but stops possible particles. Upstream of the metal plate, parallel, substantially vertical sheets are provided at a small distance from each other. These parallel sheets have an intermediate curvature, which contributes to giving the particles a desired extension transversally to the cooling water flow before they reach the metal sheet.

DE-U-296 15 575 discloses another filter for a fuel assembly in a nuclear plant. The filter consists of a frame, in which a package of sheets are provided beside each other in such a way that cooling water passages are formed between the plates. The plates have a wave-shape, which either extends in a direction transversally to the flow direction or in the flow direction.

SUMMARY OF THE INVENTION

The object of the present invention is to provide a filter, which has a low flow resistance and which may separate particles from a fluid in an efficient manner. Furthermore, it is aimed at a filter that can be manufactured at a low cost.

This object is obtained by the device initially defined, which is characterised by the combination of the features that said sheets along the first portion have a wave-shape extending in a direction transversally to the flow direction and that said sheets along the third portion have a wave-shape extending in the flow direction.

Such a filter, which may be manufactured of relatively thin sheets, has a low flow resistance since it does not require any loose components, connection members or the like which extend in the flow path. Thanks to the defined wave-shape of the sheets, a plurality of separate channels, which are arranged beside each other and which enable an efficient catching of particles in the cooling water, are obtained. The applicant has found that elongated particles are transported in the cooling water flow with an extension which substantially extends transversally to the flow direction. Such particles may consequently be caught by the filter by means of the wave-shape of the first portion. The particles, which for any reason are transported with an extension extending substantially in parallel with the flow direction, will be caught by the filter by means of the wave-shape of the third portion. The wave-shape of the sheets into directions perpendicular to each other also gives a high strength to the filter, which thus may be made self-supporting and may be mounted in for instance a fuel assembly without any frame extending around the sheets.

According to an embodiment of the invention, said wave-shapes are continuous, i.e. without any sharp transitions. In such a way, the strength is further improved and at the same time the manufacturing of the sheets by form-pressing is facilitated.

According to a further embodiment of the invention, said sheets have, also along the second portion a wave-shape in said direction transversally to the flow direction. Elongated particles which for any reason pass the third portion will have an extension transversally to the flow direction and thus be stopped by means of the wave-shape of the second portion. Advantageously, said sheets are along the first portion arranged beside each other in such a way that substantially each pair of adjacent sheets abuts each other at valleys and ridges, respectively, of said wave-shape, wherein each passage between two adjacent sheets forms a plurality of inlet channels arranged beside each other. Furthermore, said sheets may, along the second portion, also be arranged beside each other in such a way that substantially each pair of adjacent sheets abuts each other at valleys and ridges, respectively, of said wave-shape, wherein each passage between two adjacent sheets forms a plurality of outlet channels arranged beside each other.

According to a further embodiment of the invention, said sheets are connected to each other at at least one point at said valleys and ridges, respectively, preferably by means of a fuse weld, for instance in the form of a spot weld. A further simple welding method is to weld the sheet edges with or without supply of additional weld material. The heat may be supplied by means of for instance an arc (TIG), laser or electron beam. The sheets may also be welded or brazed together with additional material. By means of such a connection of the sheets, a package of attached sheets which are self-supporting is obtained, i.e. no further members are necessary for keeping the package of sheets together.

According to a further embodiment of the invention, substantially each wave of said wave-shape of the first portion and the second portion has a maximum amplitude, wherein the maximum amplitude decreases continuously in the direction towards the third portion. Advantageously, this maximum amplitude is substantially zero at the transition to the third portion.

According to a further embodiment of the invention, each inlet channel has substantially the same flow area as each outlet channel. The centre line of substantially each inlet channel may advantageously be substantially concentric with the centre line of a respective corresponding outlet channel.

According to a further embodiment of the invention, the third portion forms an intermediate channel between two adjacent sheets, which is arranged to convey the cooling water between the first portion and the second portion. Preferably, the sheets along substantially the whole third portion are arranged at a distance from each other, i.e. they do not abut each other. In this connection said sheets may along the third portion at least include a part portion extending substantially in parallel with said direction transversally to the flow direction.

According to a further embodiment of the invention, the third portion includes projections extending into the intermediate channel. By means of such projections, possible particles, which have penetrated the filter through the inlet channel and are transported with an extension transversally to the flow direction, may in an efficient manner be prevented from flowing through the filter. Advantageously, said projections are arranged along a line extending substantially in parallel with said direction transversally to the flow direction, wherein one such part portion is arranged on each side of the projections.

According to a further embodiment of the invention, said centre line of the inlet channel and the outlet channel extends between two adjacent projections of the third portion. In such a way a possible particle has to deviate further from its path in order to be able to pass through the third channel. Such projections, which may be formed by means of a plastic deformation of the sheet and/or include a tab cut from the sheet, will hinder elongated particles extending transversally to the flow direction from passing through the intermediate channel.

The object is also obtained by the fuel assembly initially defined, which is characterised by the combination of features that said sheets along the first portion have a wave-shape extending in a direction transversally to the flow direction and that said sheets along the third portion have a wave-shape extending in the flow direction. The filter and the bottom part may then be arranged to convey the cooling water into said interspace.

BRIEF DESCRIPTION OF THE DRAWINGS

The present invention is now to be explained more closely by means of various embodiments, which are described as examples, and with reference to the drawings attached.

DETAILED DESCRIPTION OF VARIOUS EMBODIMENTS OF THE INVENTION

Figure 1:
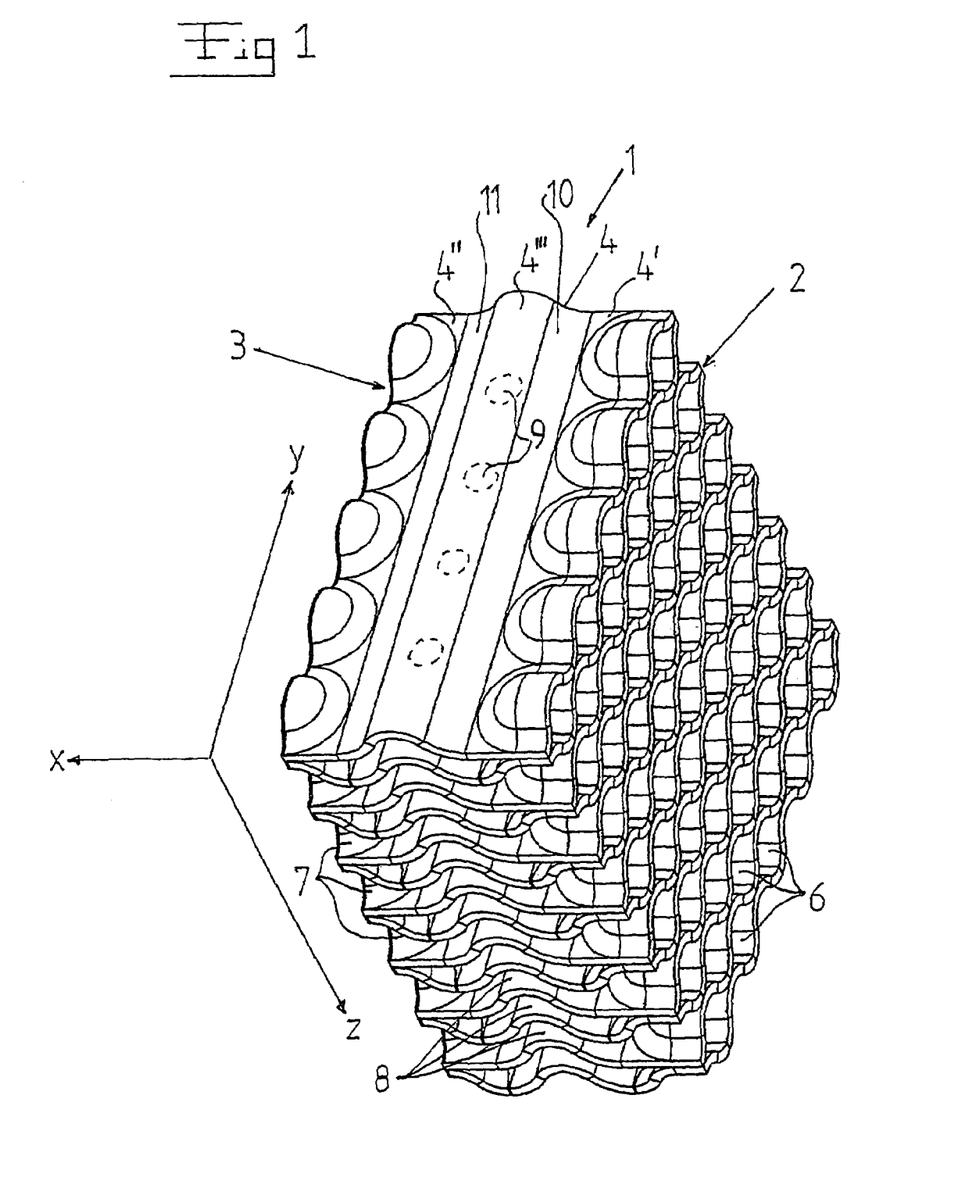
FIG. 1 discloses a perspective view of a filter according to the invention.
Figure 2:
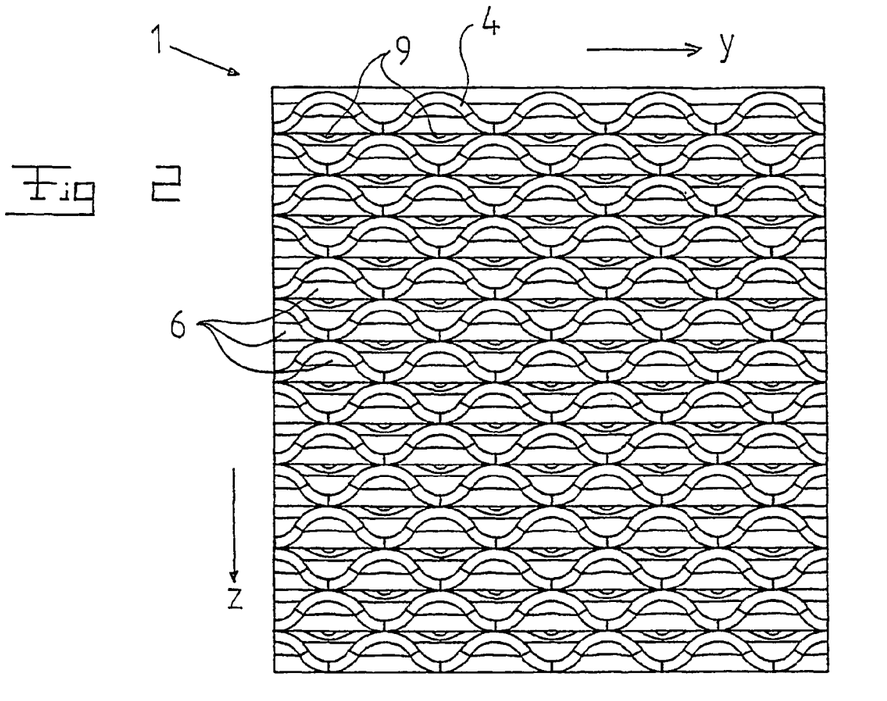
FIG. 2 discloses a side view of a filter according to the invention.
Figure 3:
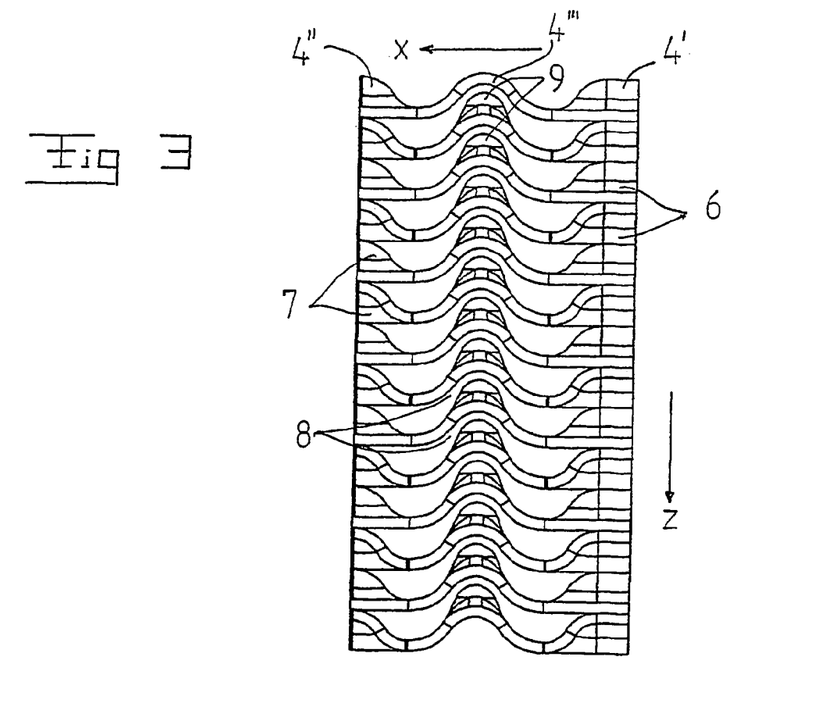
FIG. 3 discloses another side view of a filter according to the invention.

FIGS. 1–3 disclose a filter 1 for separating particles from the cooling water in a nuclear plant. The filter 1 has an inlet end 2 and an outlet end 3. The cooling water may thus flow through the filter 1 from the inlet end 2 to the outlet end 3 in a main flow direction x.

The filter 1 includes a number of sheets 4, which extend substantially in the flow direction x from the inlet end 2 to the outlet end 3. The sheets 4 are arranged beside each other and form a package of attached sheets 4. The sheets 4 are preferably manufactured of a metallic material, for instance stainless steel. The sheets 4 have a first portion 4', which extends from the inlet end 2 in the flow direction x and which has a wave-shape in a direction y extending transversally to the flow direction x. The sheets 4 also have a second portion 4", which extends from the outlet end 3 opposite to the flow direction x and which has a wave-shape in a direction y extending transversally to the flow direction x. Furthermore, the sheets 4 have a third portion 4''', which extends in the flow direction x between the first portion 4' and the second portion 4". The third portion 4''' has a wave-shape in the flow direction x, i.e. the waves of the third portion 4''' extend transversally to the waves of the first portion 4' and the second portion 4".

The sheets 4 are arranged beside each other and form passages for the cooling water through the filter 1 from the inlet end 2 to the outlet end 3. Thanks to the wave-shape of the first portion 4', the sheets 4 may be provided beside each other in such a way that substantially each pair of adjacent sheets abuts each other at abutment points or possibly along abutment lines extending along the ridges in the flow direction x. In such a way each passage between two adjacent sheets 4 will form a plurality of channels arranged beside each other between adjacent abutment lines. Such an abutment is also obtained adjacent pairs of sheets 4 along the length of the second portion 4".

The sheets 4 are attached to each other by means of one or several welds, which are applied at the abutment. In such a way, the package of sheets 4 may be kept together to a self-supporting structure. It is an advantage that the sheets have many attachment points. The particles, which by wear risk to damage the fuel, may of course damage the filter. By means of many redundant attachment points, the structure and assembly of the filter is not risked. However, it is possible to keep the package together in another way than by weld joints. For instance, various types of clamping members may be arranged around the package of sheets and press these together against each other along said abutment lines.

The channels of the first portion 4' form the inlet channels 6 for the cooling water flowing through the filter 1. In the same way, the channels of the second portion 4" form the outlet channels 7 leading the cooling water out of the filter 1. As appears from FIG. 3, the inlet channels 6 have a longer length than the outlet channels 7 in the flow direction x. However, it is to be noted that the inlet channels 6 also may be equally long as the outlet channels 7 or even shorter than the outlet channels 7. As appears from primarily FIGS. 1 and 3, the inlet channel 6 has a centre line, which is substantially concentric with the centre line of the outlet channel 7 for each channel in the filter 1, i.e. there is an outlet channel 7 located substantially opposite to an inlet channel 6. Seen in the flow direction x, the inlet channels 6 and the outlet channels 7 have a larger width in the direction y than in a direction z, which is perpendicular to the direction y and the flow direction x and which extends transversally through the plates 4 substantially perpendicular to the extension plane x, y of the sheets 4. The width of each inlet channel 6 and outlet channel 7 in the direction y may be in the order of 8–11 mm, for instance 10 mm, and the width of each inlet channel 6 and outlet channel 7 in the direction z may be in the order of 3–6 mm, for instance 5,5 mm. The total width of the filter 1 in the flow direction x may be in the order of 20–30 mm, for instance 25 or 28 mm, wherein the inlet channel 6 has a length in the order of 6–8 mm and the outlet channel 7 has a length in the order of 3–8 mm. It may be an advantage from a manufacturing point of view if the inlet and the outlet are symmetrical.

Each channel also includes an intermediate channel 8, which extends between the inlet channel 6 and the outlet channel 7 and is arranged to convey the cooling water between the first portion 4' and the second portion 4". The intermediate channels 8 are formed by the third portion 4''' of said sheets 4. The third portion 4''' connects the first portion 4' and the second portion 4". Since the third portion 4''' of each sheet 4 also includes a wave-shape, which is perpendicular to the wave-shape of the first portion 4' and the second portion 4", the intermediate channel 8 will extend in a curved path between the inlet channel 6 and the outlet channel 7. The curved path will thus have a curvature in a plane including the flow direction x and the direction z.

The intermediate channel 8 does not include channels that are delimited from each other in the same way as the inlet channels 6 and the outlet channels 7. Separate intermediate channels are defined partly by projections 9 of the sheets 4. The projections 9 are in the embodiment disclosed shaped as plastically deformed buckles of the sheet 4. These buckles are positioned at the same distance from each other along a straight line as the ridges of the wave-shape of the first portion 4' and the second portion 4". Advantageously, the projections 9 are synchronised with the ridges of the first portion 4' and the second portion 4", see FIG. 1, but may also be displaced by half a wavelength in relation to the ridges of the first portion 4' and the second portion 4", see FIG. 2. By such a design, elongated particles, which have penetrated an inlet channel 6, are prevented in a secure manner from passing through the intermediate channel 8. It is to be noted that all sheets 4 except for the uppermost one, see FIG. 3, are provided with such projections 9. The projections 9 may be designed in many different ways, for instance they can be formed by tabs being cut from the sheet 4.

The third portion 4''' includes two part portions 10, 11, which extend substantially in parallel with the direction y and perpendicularly to the flow direction x. The part portions 10 and 11 are arranged on a respective side of the line of projections 9.

Figure 4:
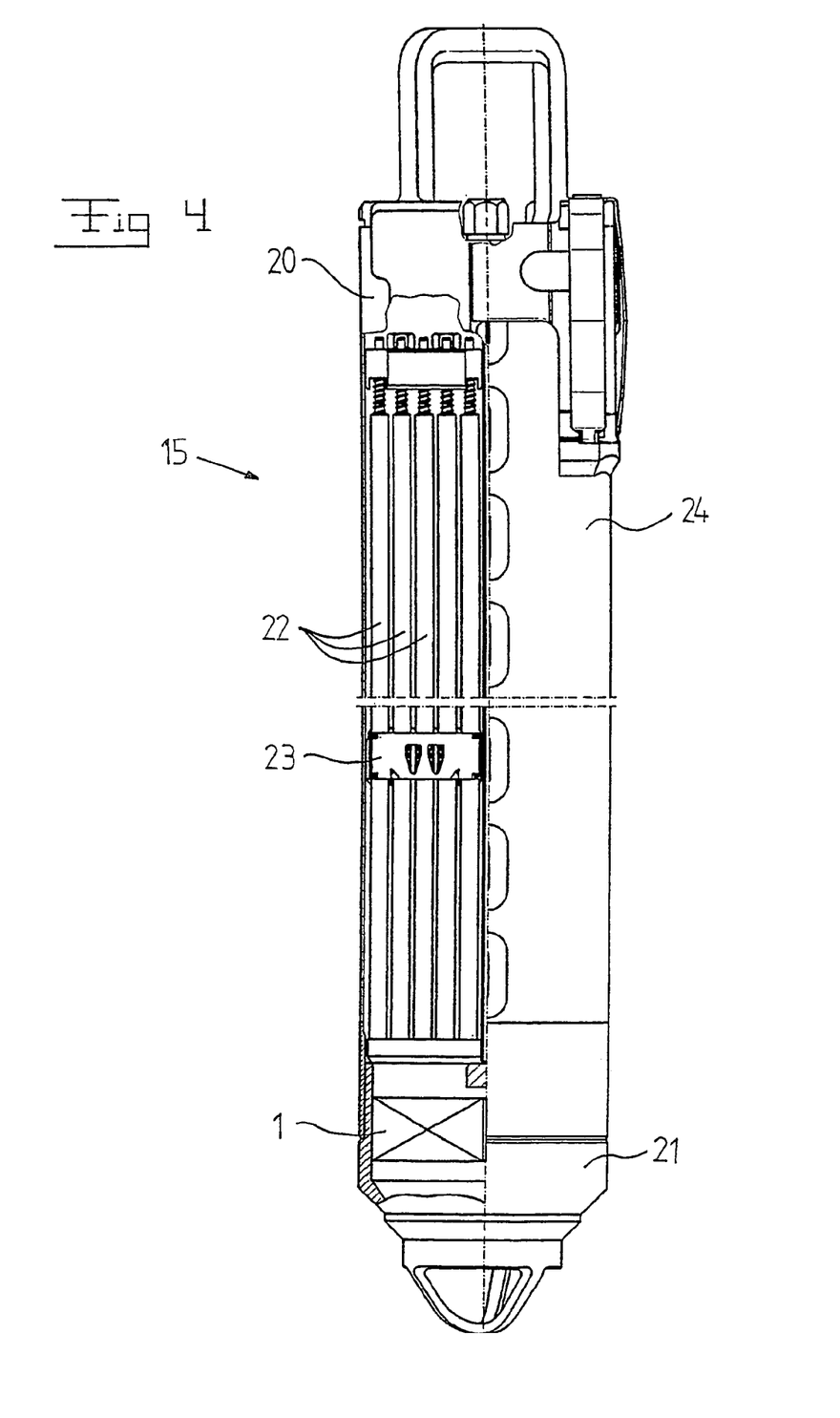
FIG. 4 discloses a schematic side view of a fuel assembly for a boiling water reactor.
Figure 5:
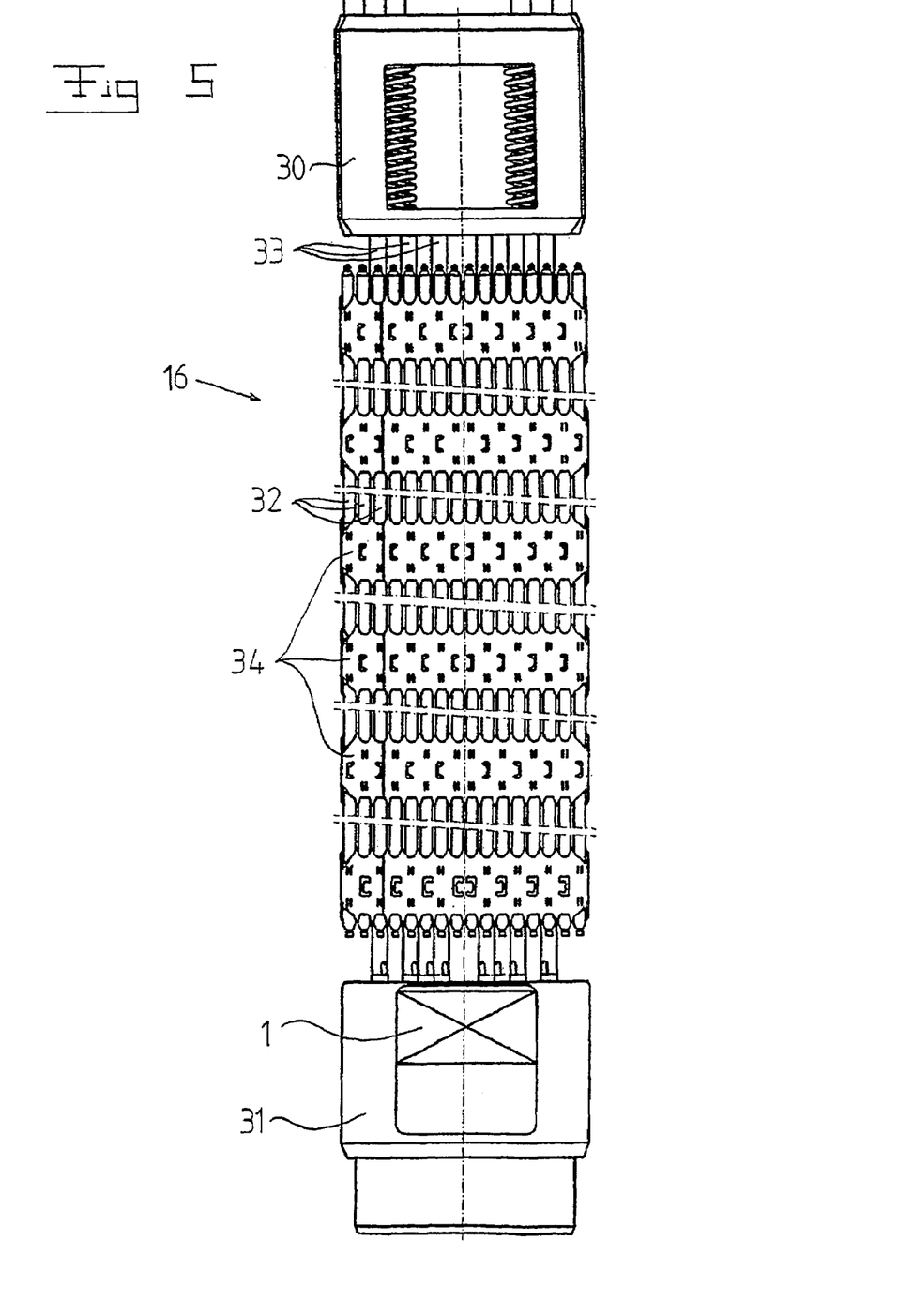
FIG. 5 discloses a schematic side view of a fuel assembly for a pressure water reactor.

The filter 1 is suitable especially but not exclusively for mounting in a fuel assembly for a nuclear plant. FIGS. 4 and 5 disclose two different types of fuel assemblies 15 and 16, respectively, which are suitable for including the filter 1. FIG. 4 discloses a fuel assembly 15 intended for a boiling water reactor, BWR, and including an upper part 20 and a bottom part 21. A number of fuel rods 22 are provided between the upper part 20 and the bottom part 21. The fuel rods are in their lower ends connected to the bottom part 21 and in their upper end to the upper part 20. Furthermore, the fuel assembly 15 includes spacers 23, which are distributed along the length of the fuel rod 22 and which serve the purpose of keeping the fuel rods 22 in a desired position. Moreover, the fuel assembly 15 includes a casing 24, which extends between the upper part 20 and the bottom part 21 and which encloses all the fuel rods 22. A filter 1 according to the description above is arranged in the bottom part 21. The filter 1 is schematically indicated in FIG. 4. The fuel assembly 15 is arranged to permit cooling water to flow into the fuel assembly through the bottom part 21 and in between the fuel rods 22.

Figure 6:
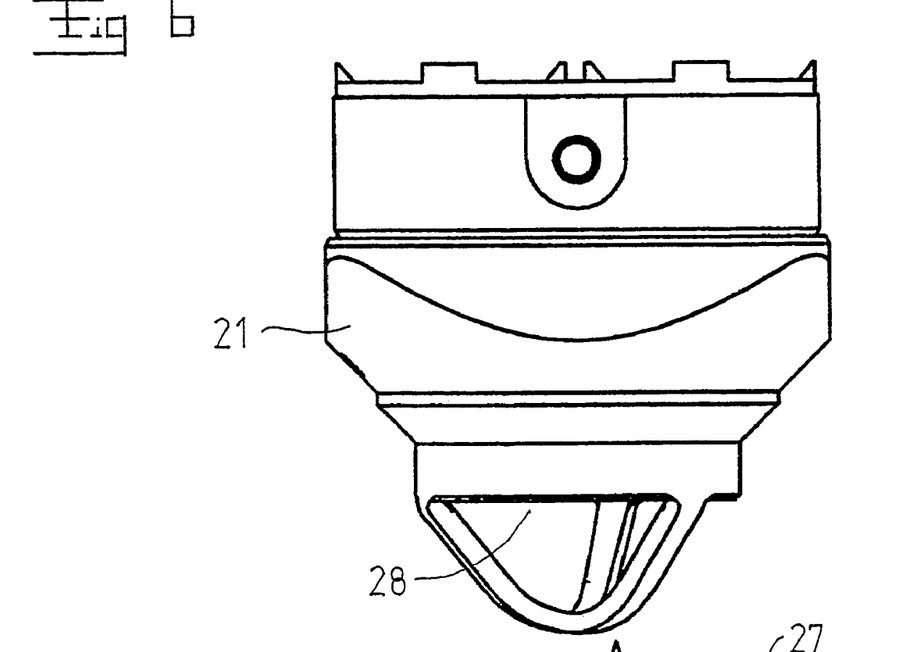
FIG. 6 discloses a side view of a bottom part of the fuel assembly in FIG. 4.
Figure 7:
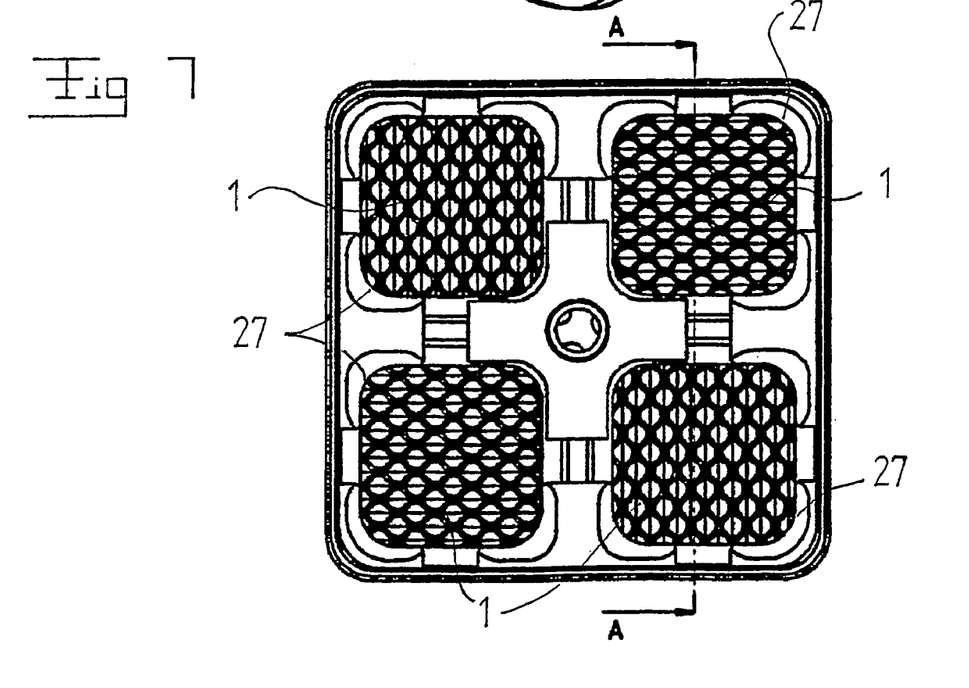
FIG. 7 discloses a view from above of the bottom part in FIG. 6.
Figure 8:
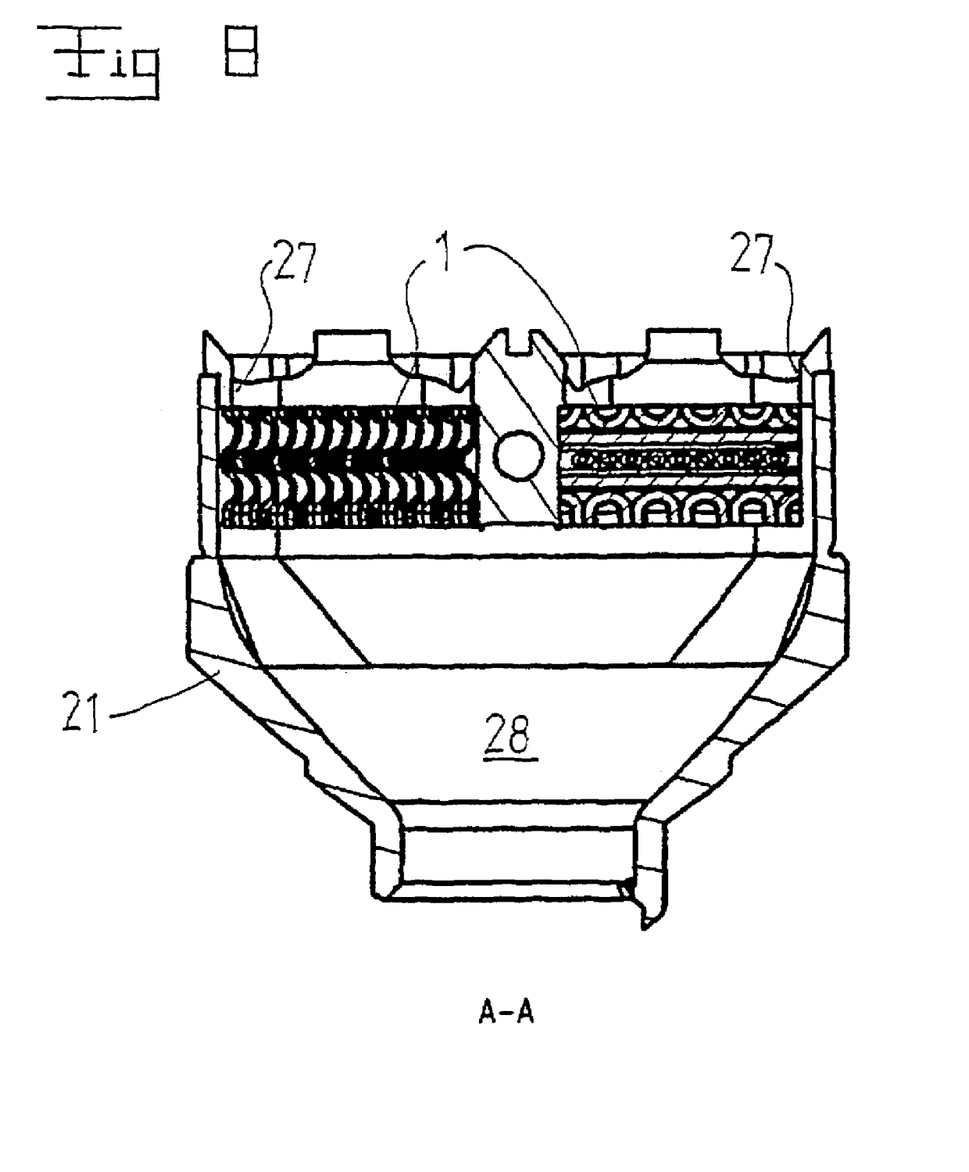
FIG. 8 discloses a sectional view from the side of the bottom part in FIG. 6 along the lines A—A in FIG. 7.

The bottom part 21 is disclosed more closely in FIGS. 6–8. From FIGS. 7 and 8 appears that the fuel assembly includes four filters 1, which are located in a respective substantially square opening 27 of the bottom part 21. The filters 1 are provided in parallel with each other and all cooling water flowing into the bottom part 21 via an inlet orifice 28 will flow through any of the filters 1. It is to be noted that the bottom part 21 also could include another number of openings 27 and filters 1, for instance one single larger opening 27 with only one filter 1.

FIG. 5 discloses a fuel assembly 16 for a pressure water reactor, PWR. The fuel assembly 16 also includes an upper part 30, a bottom part 31 and a number fuel rods 32. In addition, the fuel assembly 16 includes a number of guide tubes 33 extending between and connecting the bottom part 31 and the upper part 30. The fuel rods 32 are held by means of spacers 34 which are connected with the guide tubes 33. The filter 1 is also in this case arranged in the bottom part 31 and schematically indicated in FIG. 5. All cooling water flowing into the fuel assembly between the fuel rods 32 will thus flow through the filter 1. In the embodiment disclosed in FIG. 5, the fuel assembly 16 includes only one single filter covering the whole area of the bottom part 31 seen in a horizontal section but also in this case the fuel assembly 16 may of course include more filters 1, for instance four.

The invention is not limited to the embodiments disclosed but may be varied and modified within the scope of the following claims.

The invention claimed is:

1. A filter for separating particles from cooling water in a nuclear plant of a light water type,
wherein the filter has an inlet end and an outlet end and is arranged to permit through-flow of the cooling water in a main flow direction from the inlet end to the outlet end,
wherein the filter includes a number of sheets, which extend in the flow direction from the inlet end to the outlet end,
wherein said sheets are arranged beside each other and form passages for the cooling water through the filter front the inlet end to the outlet end, and wherein said sheets include a first portion, which extends from the inlet end, a second portion, which extends from the outlet end, and a third portion, which extends between the first portion and the second portion, wherein said sheets along the first portion have a wave-shape formed by a number of successive waves and extending in a transverse direction transversally to the flow direction, and wherein said sheets along the third portion have a wave-shape formed by a number of successive waves and extending in the flow direction, characterized in that each wave of said wave-shape of the first portion has a maximum amplitude, wherein the maximum amplitude decreases continuously in the flow direction towards the third portion, and that said maximum amplitude is zero at a transition to the third portion.

2. A filter according to claim 1, characterized in that said wave-shapes are continuous.

3. A filter according to claim 1, characterized in that said sheets along the second portion have a wave-shape formed by a number of waves and extending in said transverse direction transversally to the flow direction.

4. A filter according to claim 1, characterized in that said sheets along the first portion ore arranged beside each other in such a way that each pair of adjacent sheets abuts each other at valleys and ridges, respectively, of said wave-shape, wherein each passage between two adjacent sheets forms a plurality of inlet channels arranged beside each other.

5. A filter according to claim 4, characterized in that said sheets along the second portion are arranged beside each other in such a way that each pair of adjacent sheets abuts each other at valleys and ridges, respectively, of said wave-shape, wherein each passage between two adjacent sheets forms a plurality of outlet channels arranged beside each other.

6. A filter according to claim 1, characterized in that said sheets are connected to each other at at least one point at said valleys and ridges, respectively.

7. A filter according to claim 6, characterized in tat said sheets are connected to each other by means of a fuse weld where the sheets abut each other.

8. A filter according to claim 6, characterized in that said sheets are connected to each other by means of a spot weld where the sheets abut each other.

9. A filter according to claim 3, characterized in that each wave of said wave-shape of the second portion has a maximum amplitude, wherein the maximum amplitude decreases continuously in the direction towards the third portion.

10. A filter according to claim 5, characterized in that each inlet channel has substantially the same flow area as each outlet channel.

11. A filter according to claim 5, characterized in that the center line of each inlet channel is concentric with the center line of a respective corresponding outlet channel.

12. A filter according to claim 1, characterized in that the third portion forms an intermediate channel between two adjacent sheets.

13. A filter according to claim 12, characterized in that the third portion includes projections extending into the intermediate channel.

14. A filter according to claim 11, characterized in that said center line of the inlet channel and the outlet channel extends between two adjacent projections of the third portion.

15. A filter according to claim 13, characterized in that said projections are firmed through plastic deformation of the sheet.

16. A filter according to claim 13, characterized in that said projections include a tab, which is out from the sheet.

* * * * *